US008400721B2

(12) United States Patent
Bertele et al.

(10) Patent No.: US 8,400,721 B2
(45) Date of Patent: Mar. 19, 2013

(54) LEAF-CARTWHEEL FLEXURE, AND MOUNTING SYSTEMS AND METHODS UTILIZING SAME

(75) Inventors: Ted Bertele, Longmont, CO (US); Larry Kaylor, Longmont, CO (US)

(73) Assignee: Redstone Aerospace Corporation, Longmont, CO (US)

( * ) Notice: Subject to any disclaimer, the term of this patent is extended or adjusted under 35 U.S.C. 154(b) by 1530 days.

(21) Appl. No.: 11/683,923

(22) Filed: Mar. 8, 2007

(65) Prior Publication Data

US 2008/0216286 A1 Sep. 11, 2008

(51) Int. Cl.
*G02B 3/00* (2006.01)
(52) U.S. Cl. .......................................... 359/819; 359/642
(58) Field of Classification Search .................. 359/642, 359/811, 813, 814, 819, 822, 823, 824
See application file for complete search history.

(56) References Cited

U.S. PATENT DOCUMENTS

| | | | | |
|---|---|---|---|---|
| 2,793,028 A | * | 5/1957 | Wheeler | 267/160 |
| 2,984,996 A | * | 5/1961 | Ormond | 464/81 |
| 3,465,997 A | * | 9/1969 | Piske | 248/619 |
| 3,653,626 A | * | 4/1972 | Tucker | 248/371 |
| 3,675,588 A | * | 7/1972 | Gaynor | 104/173.2 |
| 4,261,211 A | * | 4/1981 | Haberland | 74/5 F |
| 4,382,709 A | * | 5/1983 | Brown | 403/57 |
| 4,533,100 A | * | 8/1985 | Paseri | 244/158.1 |
| 4,825,713 A | * | 5/1989 | Wilkey | 74/5 F |

FOREIGN PATENT DOCUMENTS

EP 1887398 A1 * 2/2008

OTHER PUBLICATIONS

Smith, Stuart T., "Flexures—Elements of Elastic Mechanisms," CRC Press, US, including Preface pp. xiii-xiv, Chapter I pp. 1-5, Chapter 4 pp. 167, 173-175, 199-203, Published 2000.

* cited by examiner

*Primary Examiner* — Joshua J Michener
*Assistant Examiner* — Erin W Smith
(74) *Attorney, Agent, or Firm* — Lathrop & Gage LLP

(57) ABSTRACT

A leaf-cartwheel flexure for coupling an object to a frame includes a leaf flexure for mounting to an object and a cartwheel hinge for mounting to the frame. The leaf flexure defines an axis of contraflexure and the cartwheel hinge is bendable about a rotational axis. The cartwheel hinge is coupled to the leaf flexure and positioned such that the rotational axis substantially aligns with the axis of contraflexure. A system and a method for mounting a component utilize three such leaf-cartwheel flexures for mounting the component to a frame, in which the flexures are approximately equidistant from each other about the component.

15 Claims, 7 Drawing Sheets

LEAF-CARTWHEEL FLEXURE, AND MOUNTING SYSTEMS AND METHODS UTILIZING SAME

BACKGROUND

Precision mounting of components can present certain challenges. Many high precision systems require adjustability of the position or angle of a component, as well as stability once the component is in place. Such systems may include but are not limited to optical systems. For example, it may be desirable to adjust "tip," "tilt" and "piston" of a component, with "tip" and "tilt" meaning angular adjustment of the component in orthogonal axes, and "piston" meaning translational adjustment of the component in and out of a plane formed by the axes. FIG. 1 is a schematic drawing of a mechanical assembly 1 that includes a component 2 mounted with a frame 3. An axis 10 may be designated the tilt axis, axis 20 may be designated the tip axis, and arrow 30 indicates the direction of piston movement. A set of XYZ axes is also shown in FIG. 1, with rotation about each of these axes designated by two of the axis symbols (e.g., rotation about the X axis is designated as the XX direction). Thus, in FIG. 1, tilt is equivalent to a YY rotation of component 20 centered about the component; tip is equivalent to an XX rotation of component 20 centered about the component, and piston is equivalent to translation of component 20 in the Z direction relative to frame 3.

Certain components such as optical components are often fabricated of materials such as glass, while structural components are often fabricated of metal. Since glass and metal have different coefficients of thermal expansion ("CTE"), the structural components may place stress on the optical components when temperature changes. Stress can, in turn, lead to deformation of optical surfaces. Certain optical systems include components having surfaces fabricated within tolerances of fractions of a wavelength; such systems may degrade in performance when temperature changes impart even small stresses on the components.

One strategy for mounting components with high stability precision and adjustability while mitigating degradation over a temperature range is to mount the component utilizing flexures. When flexures are used, positional adjustments may be made to the mounting of the flexure rather than to the component itself. Flexures may be mechanically weaker than the components mounted therewith, so that temperature changes cause deformation of the flexure instead of the component. However, certain flexure arrangements may be problematic in that they respond inappropriately to mechanical forces and/or are complex to build and install. For example, certain flexure arrangements may exhibit mechanical resonance in response to vibrations, and/or may permit components mounted therewith to move laterally or to twist in response to impulse forces. Other flexure arrangements utilize complex positioning schemes or actuators that may introduce issues such as high cost, tight mechanical tolerances of individual parts to produce acceptable tolerance stack-ups, and degraded performance when moving parts incur wear.

Another way to mount optical components with high precision and adjustability is through the use of complex assemblies such as gimbal mounts, which are also formed of multiple parts and which introduce many of the same issues.

An ideal mount, from a mechanical engineering perspective, is sometimes called a kinematic mount, and is characterized by its ability to constrain motion of a component in six degrees of freedom (e.g., the X, Y, Z, XX, YY and ZZ directions, as shown in FIG. 1) without overconstraining motion of the component. Overconstraining means that displacement of the mounted object in an axis of any of the six degrees of freedom generates not only an opposing force along the same axis, but also generates a force along or about one or more other axes. An advantage of a kinematic mount is that adjustments to a position of a component mounted therewith can be made (1) in one direction at a time, without affecting position or rotation of the mounted component in other directions, and (2) without introducing unintended forces on the mounted component (e.g., forces that could cause distortion of precision components).

A stiffness matrix may be used to characterize performance of an assembly. The stiffness matrix quantifies the reaction of the assembly to forces acting on it. Each row in the stiffness matrix represents reaction to either a displacement along one of three orthogonal axes or a rotation applied about one of three orthogonal axes. An entry in each column of the stiffness matrix shows the opposing, responsive force generated by the assembly in response thereto. When a component mounted with a kinematic mount is characterized by its stiffness matrix, all of the non-diagonal terms of the stiffness matrix are zero; that is, the mounted component generates an opposing force exactly equal in type to an applied displacement or rotation, without generating any force in or about other axes. For example, in a kinematic mount, a displacement along an X-axis would generate an opposing force in the X-axis without generating any force in Y- or Z-axes, or rotational force in any of the XX, YY or ZZ directions. Another way of characterizing a kinematic mount is to say that any physical constraints applied to the mounted object are non-redundant.

SUMMARY

In one embodiment, a leaf-cartwheel flexure for coupling an object to a frame includes a leaf flexure for mounting to an object and a cartwheel hinge for mounting to the frame. The leaf flexure defines an axis of contraflexure and the cartwheel hinge is bendable about a rotational axis. The cartwheel hinge is coupled to the leaf flexure and positioned such that the rotational axis substantially aligns with the axis of contraflexure.

In one embodiment, a method for mounting a component to a frame includes providing three flexure elements. Each flexure element has a leaf flexure and a cartwheel hinge that cooperate to constrain relative displacement of the component with respect to the frame in two translational axes, but do not constrain (a) relative displacement of the component with respect to the frame in a third translational axis or (b) relative rotation of the component about the translational axes with respect to the frame. The method also includes mounting each flexure element to the component such that the flexure elements are approximately equidistant from each other about the component, and mounting each flexure element to the frame.

In one embodiment, a system for mounting a component to a frame includes flexure elements positioned equidistantly about the component. Each of the flexure elements has a leaf flexure for mounting to the component, and a cartwheel hinge for mounting to the frame. The leaf flexure defines an axis of contraflexure and the cartwheel hinge is bendable about a rotational axis. The cartwheel hinge is operatively coupled to the leaf flexure, and is positioned such that the rotational axis substantially aligns with the axis of contraflexure.

DETAILED DESCRIPTION OF DRAWINGS

Figure 1:
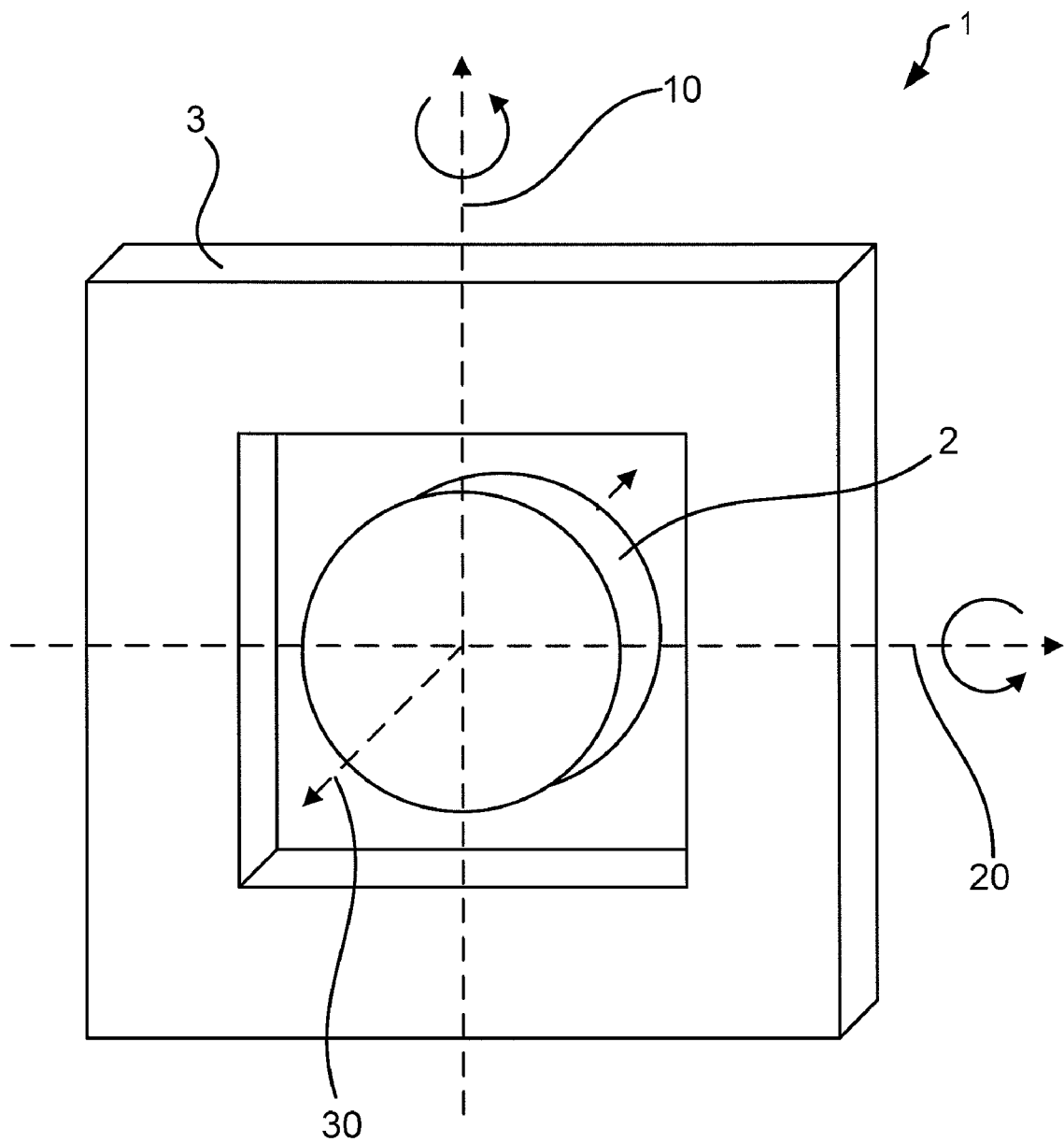
FIG. 1 is a schematic drawing of a mechanical assembly that includes a component mounted with a frame.

The present disclosure may be understood by reference to the following detailed description of the drawings included herewith. It is noted that, for purposes of illustrative clarity, certain elements in the drawings may not be drawn to scale. Specific instances or parts of an item may be referred to by use of a character in parentheses (e.g., leaf flexure parts 120(1) and 120(2)) while numerals without parentheses refer to any such item (e.g., leaf flexure 120).

Figure 2:
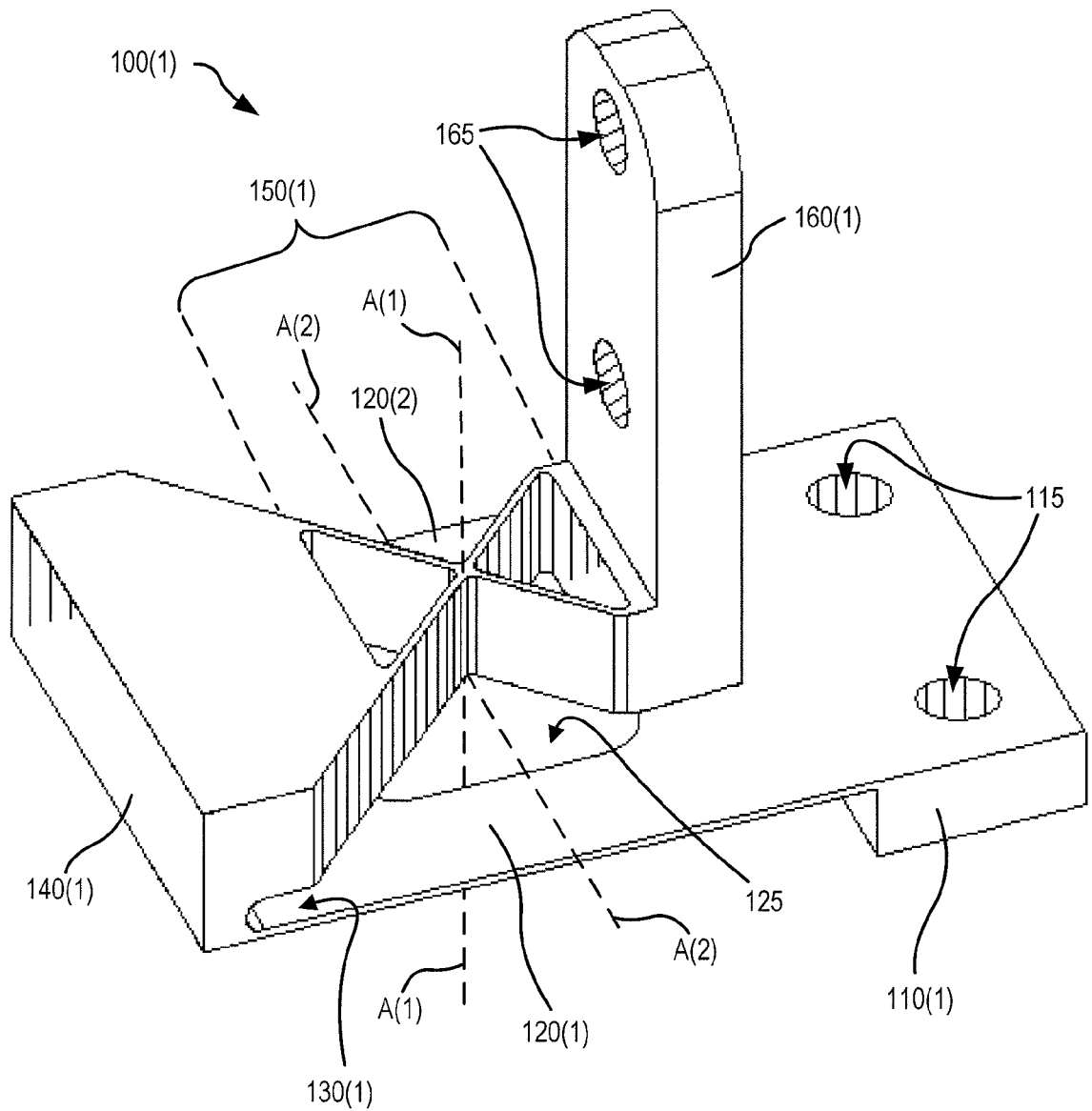
FIG. 2 shows a perspective view of a leaf-cartwheel flexure for mounting an object to a frame, in accord with an embodiment.

FIG. 2 shows a perspective view of a leaf-cartwheel flexure 100(1) for mounting a component. FIG. 2 also shows a set of XYZ axes to facilitate discussion of the features and advantages of flexure 100(1). Leaf-cartwheel flexure 100(1) includes a base 110(1), a leaf flexure 120 (formed of leaf flexure parts 120(1) and 120(2) separated by an opening 125), a brace 140(1), a cartwheel hinge 150(1), and a mounting fixture 160(1). Leaf flexure 120 forms an axis of contraflexure A(2), as shown. Cartwheel hinge 150(1) is bendable about a rotational axis A(1), which projects downwardly through axis of contraflexure A(2) of leaf flexure 120, as shown. Base 110(1), brace 140(1) and mounting fixture 160(1) are structurally rigid as compared with leaf flexure 120 and cartwheel hinge 150(1). Base 110(1) forms mounting holes 115 and mounting fixture 160(1) forms mounting holes 165; it is appreciated that base 110(1) and fixture 160(1) may, alternatively, include differing numbers of mounting holes and/or other provisions or fixtures for mounting a component to flexure 100(1). Furthermore, it is appreciated that base 110(1) and fixture 160(1) may differ in shape from the shapes shown, in order to mount to components or frames of different shapes. A transition from leaf flexure 120 to brace 140(1) optionally forms an arcuate cavity 130(1), such as shown in FIG. 2.

Leaf-cartwheel flexure 100(1) may be advantageous in that travel of mounting fixture 160(1) with respect to base 110(1) is constrained only by the stiffness (e.g., as characterized by spring constants) of leaf flexure 120 and cartwheel hinge 150(1), in the Z direction and in the XX, YY or ZZ rotational directions (referring to the coordinate axes shown in FIG. 2). Flexure 100(1) rigidly constrains travel of mounting fixture 160(1) with respect to base 110(1) in the X and Y directions. The alignment of cartwheel hinge rotational axis A(1) with leaf flexure axis of contraflexure A(2) allows leaf-cartwheel flexure 100(1) to achieve the above-noted combination of rigid constraints and spring constant constraints. Furthermore, such alignment facilitates system implementations in which tip, tilt and piston of a component (mounted to base 110(1)) may be adjusted with respect to a frame (to which mounting fixture 160(1) is mounted) without introducing overconstraint, as discussed in connection with FIG. 4 and FIG. 5 below. It is appreciated that some degree of overconstraint will occur when rotational axis A(1) is not perfectly aligned with axis of contraflexure A(2), and that such overconstraint will increase with increased misalignment of axis A(1) with axis A(2). However, such overconstraint is reduced, resulting in a nearly perfect kinematic mount when axes A(1) and A(2) are at least substantially aligned. For example, such alignment may enable a leaf-cartwheel flexure to attain ratios of 500 or more between diagonal and non-diagonal components of a stiffness matrix (see Table 1 below).

In an embodiment, leaf-cartwheel flexure 100(1) is formed of a single piece of structural material such as titanium (e.g., Ti 6AL-4V), stainless steel or other material. Flexure 100(1) may be manufactured by casting or machining; in particular, flexure 100(1) may be manufactured by mechanically machining coarse features and by wire electro-discharge machining to form fine features. In an alternative embodiment, flexure 100(1) is manufactured by fabricating any of leaf flexure 120, cartwheel hinge 150(1), base 110(1), brace 140(1) and/or mounting fixture 160(1) separately and mounting them with one another. Features of flexure 100(1) may be adapted for manufacturability; for example, opening 125 in leaf flexure 120 is adjacent to openings in cartwheel hinge 150(1) so that wires may pass through cartwheel hinge 150(1), facilitating wire electro-discharge machining. Further, features of flexure 100(1) may be adapted for components of differing masses. For example, dimensions of each of leaf flexure 120 and cartwheel hinge 150(1) determine a spring constant for each such element. Therefore, dimensions of leaf flexure 120 and hinge 150(1) may be sized to provide stiffer springs for mounting massive components and less stiff springs for mounting lighter components, or to tune a mounted component to a specified fundamental frequency.

Figure 3A:
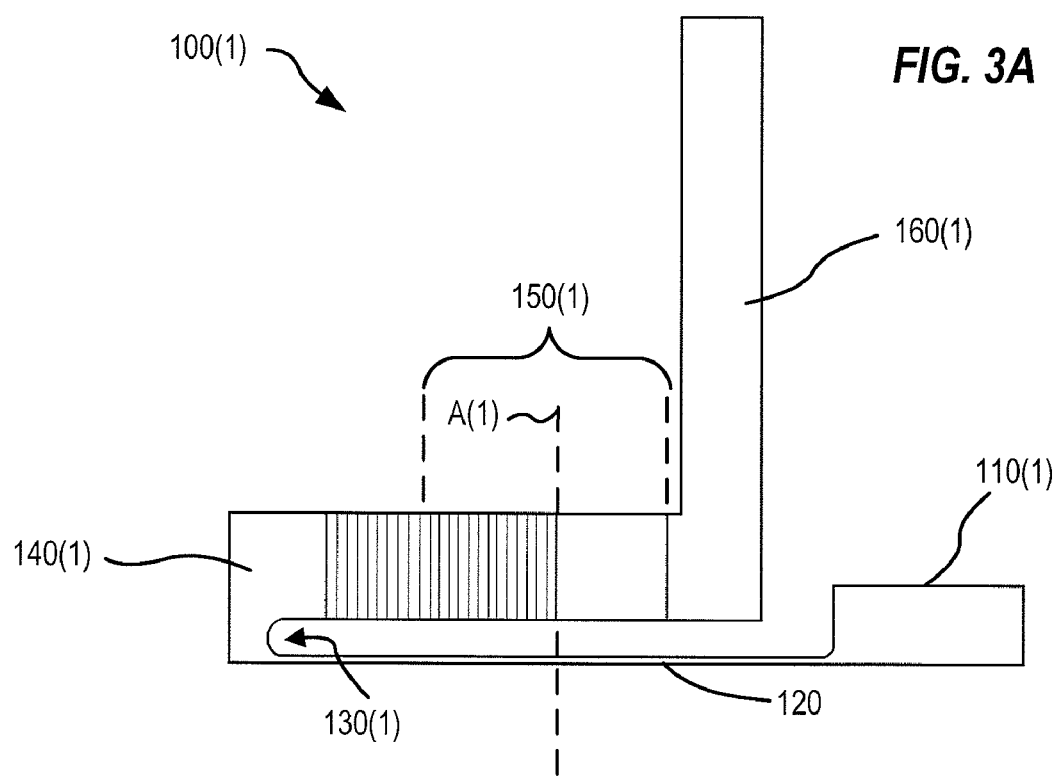
FIGS. 3A, 3B, and 3C are front elevation, top plan, and side elevation views, respectively, of the leaf-cartwheel flexure of FIG. 2.
Figure 3B:
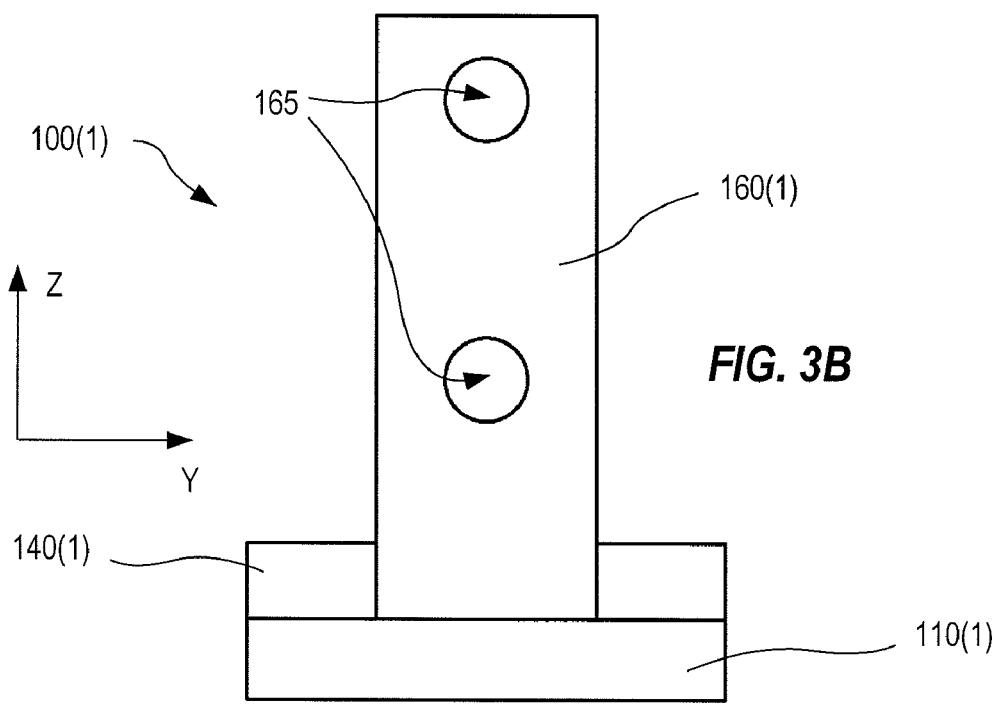
Figure 3C:
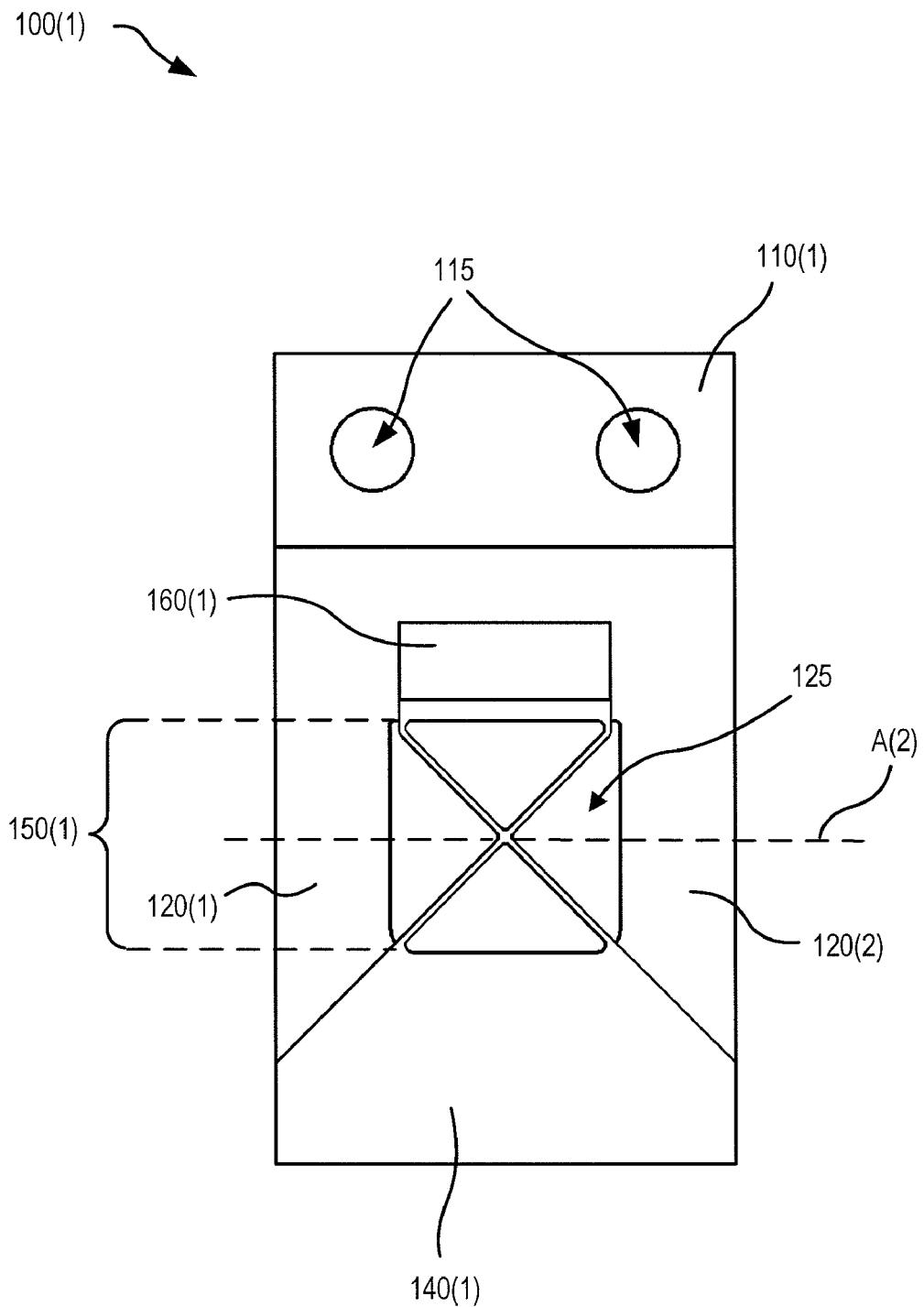

FIGS. 3A, 3B, and 3C are front elevation, top plan, and side elevation views, respectively, of flexure element 100(1).

Figure 4:
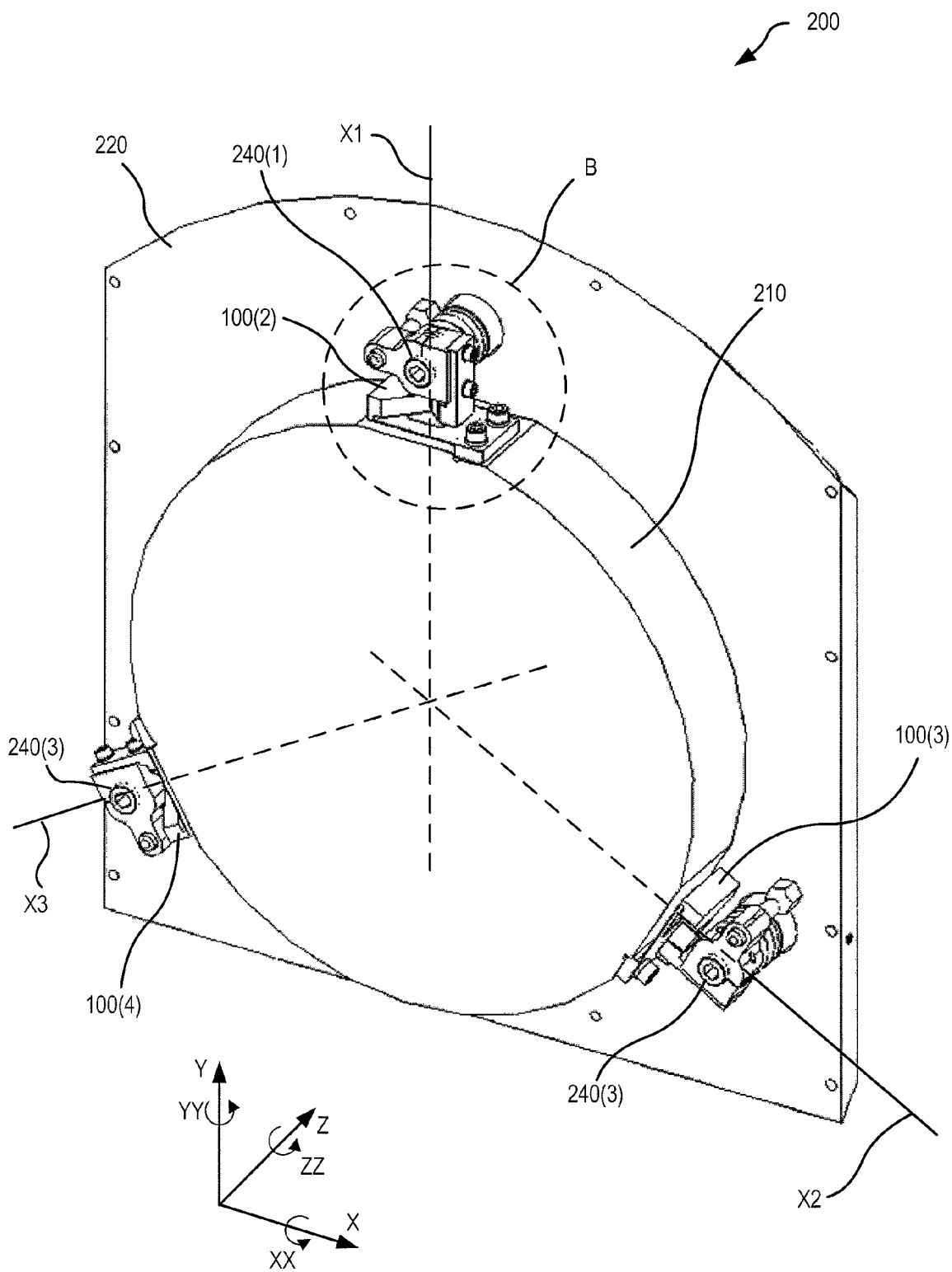
FIG. 4 shows a system having an optical component mounted to a system frame utilizing three leaf-cartwheel flexures, in accord with an embodiment.

FIG. 4 shows a system 200 having a component 210 mounted to a system frame 220 utilizing three leaf-cartwheel flexures 100(2)-100(4). Component 210 may be, for example, an optical component such as a lens or mirror, or a rigid shell holding an optical component, the position of which is desired to be adjustable within system 100. Separation of flexures 100(2)-100(4) from baseplate 200 is adjusted by utilizing corresponding adjusting screws 240(1)-240(3), as explained below in connection with FIG. 5. A portion B of system 200 is shown in detail in FIG. 5; each of flexures 100(3) and 100(4) interface with similar hardware as flexure 100(2) shown in FIG. 4.

Flexures 100(2)-100(4) are arranged such that axes X1, X2 and X3 pass through a cartwheel hinge of each of flexures 100(2), 100(3) and 100(4) respectively (e.g., like axis A(1) shown in FIG. 2); axes X1, X2 and X3 intersect at the center of mass of component 210, as shown. When component 210 is mounted within system 200 as shown in FIG. 4, leaf-cartwheel flexures 100(2)-100(4) cooperate with component 210 such that each degree of freedom of component 210 is constrained, but no degree of freedom is overconstrained. As explained in connection with FIG. 2, each individual flexure 100 rigidly constrains motion of mounting fixture 160(1) with respect to base 110(1) only in the X and Y directions in the coordinate system of the flexure itself. All other degrees of freedom between mounting fixture 160(1) and base 110(1) are constrained by the spring constants of the leaf flexure 120 and cartwheel hinge 150(1). When mounted as shown in FIG. 4, the additional constraint imposed by the rigidity of component 210 causes the X and Y constraints (as defined in FIG.

2) to cooperate with each other so as to form a nearly perfect kinematic mount, as discussed below in connection with Table 1.

For example, consider a deflection of component 210 in the +Y direction as shown in FIG. 4. The +Y direction corresponds to the Z direction (as defined in FIG. 2) of flexure 100(2), but corresponds to a combination of Z and X directions (as defined in FIG. 2) of flexures 100(3) and 100(4). Since travel of mounting fixture 160(1) with respect to base 100 is rigidly constrained in the X direction (as defined in FIG. 2), each of flexures 100(3) and 100(4) generates a strong opposing force to the +Y deflection (as defined in FIG. 4). It is appreciated by one skilled in the art that similar combinations of forces constrain component 210 in each of the X, Z, XX, YY and ZZ directions, as defined in FIG. 4. Furthermore, tip, tilt and piston of component 210 can be adjusted, using adjusting screws 240(1)-240(3), within a fairly large range of values, without overconstraining any degree of freedom, as discussed below in connection with FIG. 5.

Table 1 shows a stiffness matrix characterizing system 200 when leaf-cartwheel flexures 100(2)-100(4) are manufactured of Ti 6AL-4V and component 210 is an optic cell weighing 1.1 pounds. The value in each cell of Table 1 is a spring rate—in k[lbs/in] for forces along a translational axis, or k[in-lbs/rad] for forces about a rotational axis—of an opposing force generated by a displacement applied in the direction given by the row. For example, the first row labeled X shows that for a deflection of 0.001 inches in the X axis, the opposing forces are −5114 lbs/in in the X direction, zero in the Y and Z directions, −6[in-lbs/rad] in the XX rotational direction, 3[in-lbs/rad] in the YY rotational direction, and zero in the ZZ rotational direction. In Table 1, each diagonal coefficient is at least a factor of 500 greater than any other coefficient in the same row or column. Such high ratios mean that overconstraint is nearly eliminated; that is, displacement along or about any axis results in an opposing force that is aligned with the corresponding axis, and much smaller (if any) opposing forces along or about any other axes.

TABLE 1

Stiffness matrix characterizing system 200.

| | | Direction of responsive force | | | | | |
|---|---|---|---|---|---|---|---|
| | | X | Y | Z | XX | YY | ZZ |
| Direction of applied displacement | X | −5114 | 0 | 0 | −6 | 3 | 0 |
| | Y | 0 | 5116 | 0 | 3 | −7 | −2 |
| | Z | 0 | 0 | −8932 | −7 | 15 | 13 |
| | XX | −6 | 3 | −7 | 25222 | −18 | −2 |
| | YY | −3 | −7 | 15 | 18 | 25239 | 2 |
| | ZZ | 0 | −2 | 13 | −2 | 2 | −56604 |

Figure 5:
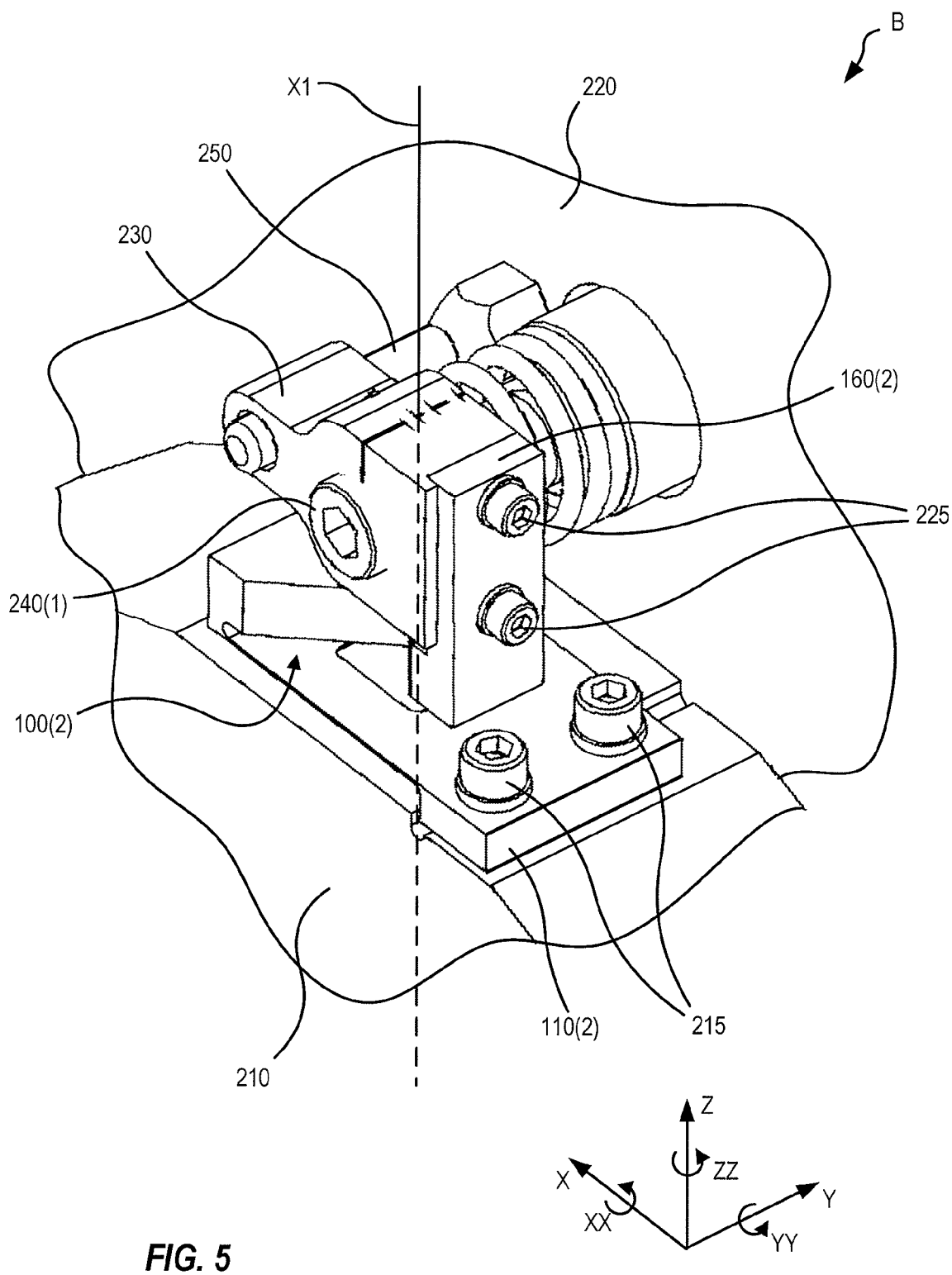
FIG. 5 shows an enlarged view of one portion of the system of FIG. 4.

FIG. 5 shows an enlarged view of portion B of system 200. Mounting screws 215 secure base 110(2) of flexure 100(2) to component 210; mounting screws 225 secure mounting fixture 160(2) of the flexure to a locknut 230. Adjusting screw 240(1) is configured to move locknut 230 perpendicularly with respect to system frame 220. Locknut 230 also slides over a guide rod 250 that is oriented perpendicularly with respect to system frame 220; guide rod 250 and locknut 230 thus cooperate with adjusting screw 240(1) to maintain an orientation of locknut 230, so that adjustments to adjusting screw 240(1) do not exert a twisting force on mounting fixture 160(2) but instead move it only perpendicularly with respect to frame 220.

Returning to FIG. 4, it can be seen that adjusting screws 240 and guide rods 250 only guide motions during adjustment of component 210 and are not moving parts in ongoing use. Thus, after separation of each of flexures 100 from baseplate 200 is set by the corresponding adjusting screws 240, and component 210 "floats" on flexures 100 relative to baseplate 200. Further, motion of component 210 is constrained by flexures 100 without overconstraint, and adjusting screws 240 may be utilized to adjust any or all of tip, tilt and piston of component 210 in system 200 without introducing overconstraint.

Figure 6:
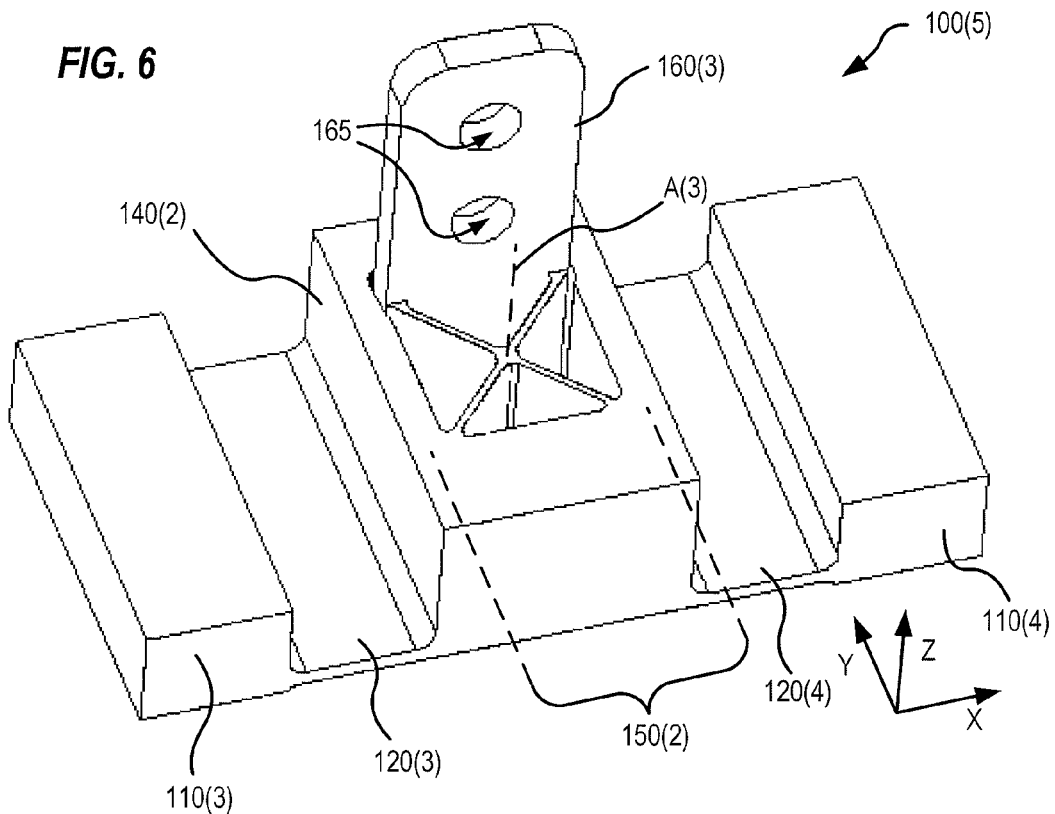
FIG. 6 shows a perspective view of a leaf-cartwheel flexure for mounting a component, in accord with an embodiment.

FIG. 6 shows a perspective view of a leaf-cartwheel flexure 100(5) for mounting a component. Flexure 100(5) includes bases 110(3) and 110(4), leaf flexures 120(3) and 120(4), a brace 140(2), a cartwheel hinge 150(2), and a mounting fixture 160(3). Cartwheel hinge 150(2) hinges about an axis A(3), as shown. Bases 110(3) and 110(4), brace 140(2) and mounting fixture 160(3) are structurally rigid as compared with leaf flexures 120(3) and 120(4) and cartwheel hinge 150(2). Bases 110(3) and 110(4) may form mounting holes (not shown) and mounting fixture 160(3) forms mounting holes 165; it is appreciated that bases 110(3) and 110(4) and fixture 160(3) may, alternatively, include differing numbers of mounting holes and/or other provisions or fixtures for mounting flexure 100(3) to objects. Furthermore, it is appreciated that bases 110(3) and 110(4) and fixture 160(3) may differ in shape from the shapes shown, in order to mount to components or frames of different shapes. Flexure element 100(5) is utilized like elements 100(1)-100(4) except that bases 110(3) and 110(4) of flexure element 100(5) may both mount to a component. Since axis A(3) passes through the center of brace 140(2), which is in turn held equally on either side by leaf flexures 120(3) and 120(4), travel of bases 110(3) and 110(4) is constrained rigidly with respect to mounting fixture 160(3) in the X and Y directions shown, but the Z direction and all rotational directions are constrained only by the spring constants of leaf flexures 120(3) and 120(4) and of cartwheel hinge 150(2). Therefore, leaf-cartwheel flexure 100(5) may be utilized in much the same way as flexures 100(1)-100(4) for mounting a component.

Figure 7:
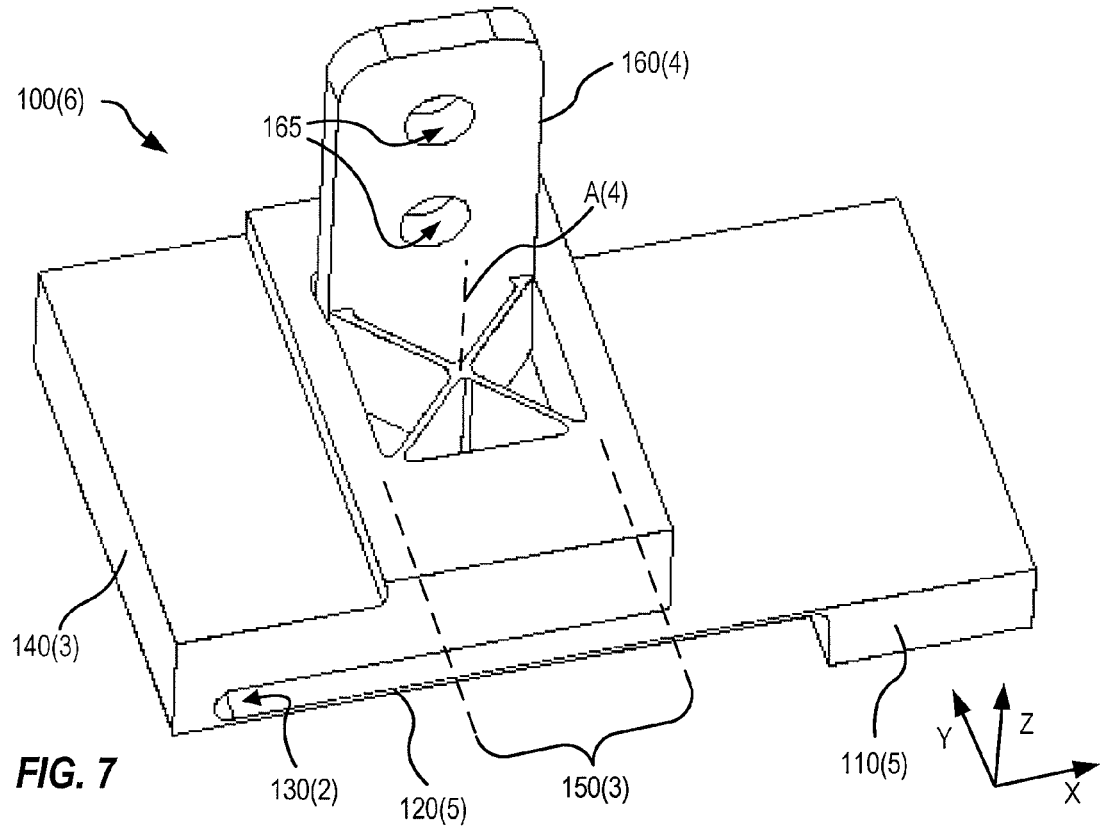
FIG. 7 shows a perspective view of a leaf-cartwheel flexure for mounting a component, in accord with an embodiment.

FIG. 7 shows a perspective view of a flexure element 100(6) for mounting a component. Flexure 100(6) includes a base 110(5), a leaf flexure 120(5), a brace 140(3), a cartwheel hinge 150(3), and a mounting fixture 160(4). Cartwheel hinge 150(3) hinges about an axis A(4), as shown. Base 110(5), brace 140(3) and mounting fixture 160(4) are structurally rigid as compared with leaf flexure 120(5) and cartwheel hinge 150(3). Base 110(5) may form mounting holes (not shown) and mounting fixture 160(3) forms mounting holes 165; it is appreciated that base 110(5) and fixture 160(3) may, alternatively, include differing numbers of mounting holes and/or other provisions or fixtures for mounting flexure 100(6) to objects. Furthermore, it is appreciated that bases 110(3) and 110(4) and fixture 160(3) may differ in shape from the shapes shown, in order to mount to components or frames of different shapes. Flexure element 100(6) is utilized like elements 100(1)-100(4). Since axis A(4) passes through the center of leaf flexure 120(5), travel of base 110(5) is constrained rigidly with respect to mounting fixture 160(4) in the X and Y directions shown, but the Z direction and all rotational directions are constrained only by the spring constants of leaf flexure 120(5) and of cartwheel hinge 150(3). Therefore, flexure 100(6) may be utilized in much the same way as flexures 100(1)-100(4) for mounting a component.

The changes described above, and others, may be made in the leaf-cartwheel flexures described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A leaf-cartwheel flexure for coupling an object to a frame, comprising
   a rigid base that is configured for mounting to an object;
   a leaf flexure having a first end and a second end, the first end coupling with the base, the leaf flexure defining an axis of contraflexure between the first end and the second end;
   a rigid brace that couples with the second end of the leaf flexure;
   a cartwheel hinge having first, second, third and fourth members that join at and are bendable about a rotational axis that perpendicularly intersects the axis of contraflexure; the first and second members of the cartwheel hinge coupling with the brace, and
   a rigid mounting fixture that couples with the third and fourth members of the cartwheel hinge.

2. Leaf-cartwheel flexure of claim 1 wherein the leaf flexure and the cartwheel hinge are formed from a single, monolithic piece of material.

3. Leaf-cartwheel flexure of claim 2 wherein the material is one of titanium and stainless steel.

4. Leaf-cartwheel flexure of claim 2 wherein at least one of the leaf flexure and the cartwheel hinge are formed utilizing wire electro-discharge machining.

5. Leaf-cartwheel flexure of claim 4 wherein coarse features of at least one of the leaf flexure and the cartwheel hinge are formed mechanically before utilizing the wire electro-discharge machining.

6. Leaf-cartwheel flexure of claim 4 wherein the leaf flexure forms an opening to facilitate wire electro-discharge machining that forms the cartwheel hinge.

7. Leaf-cartwheel flexure of claim 1 wherein the leaf flexure and the cartwheel hinge are formed of different materials.

8. Leaf-cartwheel flexure of claim 1 wherein spring coefficients of the leaf flexure and the cartwheel hinge are optimized so that a system utilizing three of the flexure elements to mount a component may be characterized by a stiffness matrix having diagonal coefficients that are at least 500 times the value of each other coefficient of the matrix in the same row or column as the diagonal coefficient.

9. A system for mounting a component to a frame, comprising
   a plurality of flexure elements positioned equidistantly about the component, each of the flexure elements having
      a rigid base that is configured for mounting to an object;
      a leaf flexure having a first end and a second end, the first end coupling with the base, the leaf flexure defining an axis of contraflexure between the first end and the second end;
      a rigid brace that couples with the second end of the leaf flexure;
      a cartwheel hinge having first, second, third and fourth members that join at and are bendable about a rotational axis; that perpendicularly intersects the axis of contraflexure; the first and second members of the cartwheel hinge coupling with the brace, and
      a rigid mounting fixture that couples with the third and fourth members of the cartwheel hinge.

10. System of claim 9 wherein spring coefficients of the leaf flexure and the cartwheel hinge are optimized so that the system is characterized by a stiffness matrix having diagonal coefficients that are at least 500 times the value of each other coefficient of the matrix in the same row or column as the diagonal coefficient.

11. System of claim 9, further comprising means for independently adjusting a distance of each flexure element from the frame.

12. A system for mounting a component to a frame, comprising
   a plurality of flexure elements positioned equidistantly about the component, each of the flexure elements having
      a leaf flexure for mounting to the component, the leaf flexure defining an axis of contraflexure; and
      a cartwheel hinge for mounting to the frame, the cartwheel hinge bendable about a rotational axis;
      the cartwheel hinge being operatively coupled to the leaf flexure and positioned such that the rotational axis substantially aligns with the axis of contraflexure, and
   means for independently adjusting a distance of each flexure element from the frame, wherein the means for independently adjusting a distance of each flexure element from the frame comprises an adjusting screw.

13. System of claim 12, wherein the means for independently adjusting a distance of each flexure element from the frame further comprises a locknut and guide rod that cooperate with the adjusting screw to maintain an orientation of the flexure element relative to the frame.

14. System of claim 13, the guide rod being oriented perpendicularly with respect to the frame, and a mounting fixture of the flexure element being secured to the locknut, such that the locknut slides over the guide rod as the adjusting screw moves the locknut perpendicularly with respect to the frame.

15. System of claim 9, wherein the rotational axes of the cartwheel hinges intersect at a center of mass of the component.

* * * * *